United States Patent
He et al.

(10) Patent No.: US 11,206,300 B2
(45) Date of Patent: *Dec. 21, 2021

(54) PROVIDING INSTRUCTIONS DURING REMOTE VIEWING OF A USER INTERFACE

(71) Applicant: INTERNATIONAL BUSINESS MACHINES CORPORATION, Armonk, NY (US)

(72) Inventors: Jenny J. He, Chandler's Ford (GB); Adrian Kyte, Broadstone (GB); Guan Jun Liu, Beijing (CN); Joe Winchester, Hursley (GB); Bei Chun Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 131 days.

This patent is subject to a terminal disclaimer.

(21) Appl. No.: 15/806,366

(22) Filed: Nov. 8, 2017

(65) Prior Publication Data

US 2019/0068685 A1    Feb. 28, 2019

Related U.S. Application Data

(63) Continuation of application No. 15/689,038, filed on Aug. 29, 2017.

(51) Int. Cl.
*G06F 3/048* (2013.01)
*H04L 29/08* (2006.01)
(Continued)

(52) U.S. Cl.
CPC ........ *H04L 67/025* (2013.01); *G06F 3/04842* (2013.01); *G06Q 10/101* (2013.01); *H04L 65/403* (2013.01); *H04L 67/38* (2013.01)

(58) Field of Classification Search
CPC ... G06F 3/04842; H04L 67/025; H04L 67/38; H04L 65/403; G06Q 10/101
See application file for complete search history.

(56) References Cited

U.S. PATENT DOCUMENTS

| 5,608,872 A | 3/1997 | Schwartz |
| 5,649,104 A | 7/1997 | Carleton et al. |

(Continued)

FOREIGN PATENT DOCUMENTS

| CN | 101529382 A | 9/2009 |
| CN | 104239044 A | 12/2014 |

(Continued)

OTHER PUBLICATIONS

Appendix P, List of IBM Patents or Patent Applications Treated as Related dated Nov. 8, 2017.

(Continued)

*Primary Examiner* — Haoshian Shih
(74) *Attorney, Agent, or Firm* — Cantor Colburn LLP; Edward Wixted

(57) ABSTRACT

Method and system are provided for providing instructions during remote viewing of a user interface. The method carried out at a host computer system includes: capturing an image of one or more application user interfaces as displayed at the host computer system; and serializing data of each application user interface to provide a map of each window class and containers and/or control elements of the window class, wherein a container has attributes and child control elements. The captured image and the map are transmitted to a remote computer system; and control element input instructions are received from a remote computer system for instructing an interaction with a control element.

14 Claims, 10 Drawing Sheets

(51) Int. Cl.
*G06F 3/0484* (2013.01)
*G06Q 10/10* (2012.01)
*H04L 29/06* (2006.01)

(56) References Cited

U.S. PATENT DOCUMENTS

| | | | | |
|---|---|---|---|---|
| 5,727,155 | A * | 3/1998 | Dawson | G06F 9/468 |
| | | | | 709/205 |
| 6,008,804 | A | 12/1999 | Pommier et al. | |
| 6,581,203 | B1 | 6/2003 | Nguyen et al. | |
| 7,310,659 | B1 * | 12/2007 | George | G06F 9/546 |
| | | | | 709/206 |
| 7,752,601 | B1 | 7/2010 | York | |
| 9,225,936 | B2 | 12/2015 | Baside et al. | |
| 9,361,469 | B2 | 6/2016 | Thiyagarajan et al. | |
| 9,571,538 | B2 | 2/2017 | Salama et al. | |
| 2004/0059782 | A1 * | 3/2004 | Sivertsen | H04L 67/025 |
| | | | | 709/204 |
| 2004/0179036 | A1 * | 9/2004 | Teplov | G06F 3/1454 |
| | | | | 715/751 |
| 2004/0196314 | A1 * | 10/2004 | Bhogal | G06F 3/04892 |
| | | | | 715/780 |
| 2007/0150804 | A1 * | 6/2007 | Foulger | G06F 16/954 |
| | | | | 715/207 |
| 2008/0174561 | A1 * | 7/2008 | Kim | G06F 3/0488 |
| | | | | 345/173 |
| 2009/0013044 | A1 * | 1/2009 | Stull | G06Q 10/10 |
| | | | | 709/205 |
| 2010/0211882 | A1 * | 8/2010 | Bailey | H04L 67/025 |
| | | | | 715/740 |
| 2013/0086166 | A1 | 4/2013 | Findlay et al. | |
| 2013/0290856 | A1 * | 10/2013 | Beveridge | G06F 9/452 |
| | | | | 715/740 |
| 2014/0026057 | A1 * | 1/2014 | Kimpton | G06F 9/451 |
| | | | | 715/733 |
| 2014/0040763 | A1 | 2/2014 | Chakra et al. | |
| 2014/0053086 | A1 * | 2/2014 | Kim | H04L 65/4015 |
| | | | | 715/753 |
| 2015/0052067 | A1 | 2/2015 | Thiyagarajan et al. | |
| 2015/0319178 | A1 * | 11/2015 | Desai | H04W 12/08 |
| | | | | 726/1 |
| 2016/0006800 | A1 * | 1/2016 | Summers | G06F 9/5055 |
| | | | | 709/203 |
| 2016/0261671 | A1 * | 9/2016 | AbiEzzi | H04L 67/025 |

FOREIGN PATENT DOCUMENTS

| | | |
|---|---|---|
| CN | 105912314 A | 8/2016 |
| WO | 2019043535 A1 | 3/2019 |

OTHER PUBLICATIONS

He, Jenny J. et al., "Providing Instructions During Remote Viewing of a User Interface" U.S. Appl. No. 15/689,038, filed Aug. 29, 2017.
IBM "Revised Appendix P", List of IBM Patents or Patent Applications Treated as Related dated Feb. 13, 2018; 2 pgs.
International Search Report and Written Opinion for International Application PCT/IB2018/056427; International Filing Date: Jan. 4, 2019; dated Jan. 4, 2019; 9 pgs.
United Kingdom Examination Report under Section 18(3) for Application No. GB2001659.8; dated Mar. 13, 2020; 5 pgs.

* cited by examiner

PROVIDING INSTRUCTIONS DURING REMOTE VIEWING OF A USER INTERFACE

DOMESTIC PRIORITY

This application is a continuation of U.S. patent application Ser. No. 15/689,038, filed Aug. 29, 2017, the disclosure of which is incorporated by reference herein in its entirety.

BACKGROUND

The present invention relates to remote viewing of a user interface, and more specifically, to providing instruction to a host computer system during remote viewing of its user interface.

Screen sharing or desktop sharing enable remote access and control of a host computer system by a remote computer system via a network. Remote desktop software may be provided as an application, hosted service, or as part of an operating system to allow a desktop environment to the run remotely whilst being displayed on a separate client device.

This may be used in a number of different scenarios, one of which is to assist the user of the host computer system with operation of one or more applications running on the host computer system.

This may be used during a web meeting as a means of enabling two or more users to view and act on a screen. This is useful in providing instructions on how to interact with an application being displayed. In one example, a screen with an application may be shared with a wizard page and the other user in the web conference may be providing assistance for driving the application. This occurs in scenarios such as support where one user is sharing a screen that they are having an issue running and the second user is watching and providing support.

This has the disadvantage that control of the host computer must be given to the remote user. There may be security issues with this that may prevent it from being allowed due to corporate policies. There may also be firewall implications with desktop sharing.

A further disadvantage from a learning perspective is that the user sharing their screen gives up control and they will not be the one driving their application by typing and making the required inputs.

The user who gives control can no longer operate their computer. If, for example, a chat message appears that they need to respond to, then they must take back control, attend to with the chat message answer, and then give up control again.

Remote control can also only be given to one user at a time. In a scenario where multiple users are on a conference providing assistance, each has to be given control one at a time making the interaction disjointed and involving a lot of latency during control switching.

Another option is to use a web conference to display the display of the whole screen or a selected application displayed at the host computer system to multiple remote computer systems. A user observing the display provides help and assistance through verbal or typed instructions.

In one example, a web conference may take place at the same time as a phone call so the user providing assistance might say, "type xxxx into the volume serial text box and press next". The disadvantage of this is that support may be provided across languages so that there may be a translation issue with verbal instructions. Also, delays in the display being relayed to the remote observer may cause confusion.

One or more users providing support might also type their instructions into a text area, such as a comments panel or chat area in a web conferencing application. For example "Type value xxx into control yyyyy". The advantage this has over desktop sharing is that multiple users can interact and have a conversation about the way to provide assistance.

This has the disadvantage in that it is in a separate area of the screen and it requires the user displaying their application to read this, translate it back to the action they need to perform and is therefore error prone and includes latency. In some cases, if there are multiple buttons or controls with the same label then it is difficult to identify the control being referred to in the screen being displayed.

With web conferences that include latency it is also possible that an instruction such as "type next on the wizard" is typed for one wizard page, but the user has advanced to the next page when they receive it and type. There is a need to tie the instruction to the control.

SUMMARY

According to an aspect of the present invention there is provided a computer-implemented method for providing instructions during remote viewing of a user interface, the method carried out at a host computer system and comprising: capturing an image of one or more application user interfaces as displayed at the host computer system; serializing data of each application user interface to provide a map of each window class and containers and/or control elements of the window class, wherein a container has attributes and child control elements; transmitting the captured image and the map to a remote computer system; and receiving control element input instruction from a remote computer system for instructing an interaction with a control element for display in a context of the control element in the application user interface.

The method has the advantage that an image of the one or more application user interfaces together with the serialized data map provides an exact reference of a control element enabling a remote user to provide an input instruction in context. The received input instruction may be displayed in the context of the control element at the host computer system.

Serializing data of each application user interface may include analyzing each window class in an active application user interface to identify the containers and/or control elements provided by the window class. Providing a map may include a type, size and location of each window class and a type, size and location of each container and/or control element within a window class. Serializing data of each application user interface may analyze each level of window classes from the top-most level downwards in the display and may record the level in the map.

The method may include enabling the control element input instruction to be activated in or entered into the application user interface further to confirmation input from a user of the application user interface. This has the advantage that the host computer system user may accept the input instruction without having to copy and past any text or interact with the control element itself. Displaying the input instruction in a context of the control element in the application user interface may include displaying the control element input instruction adjacent or referencing graphically the control element.

Receiving a control element input instruction may include one or more of the group of: a control element type, a control element location, a control element identifier, and a remote user identifier. Receiving a control element input instruction from a remote computer system may be received with a returned original image and/or map to verify that the application user interface is still current and the instruction is applicable to the application user interface.

The method may include receiving a holding indication that a control element input instruction from a remote computer system is currently being input at the remote computer system.

According to another aspect of the present invention there is provided a computer-implemented method for providing instructions during remote viewing of a user interface, the method carried out at an instructor computer system and comprising: receiving an image of one or more application user interfaces as displayed at a host computer system and a map serializing the data of each application user interface including each window class and containers and/or control elements of the window class, wherein a container has attributes and child control elements; identifying a control element in the map by reference to the image; receiving input of a control element input instruction from a user of the instructor computer system; and transmitting the control element input instruction to the host computer system.

Identifying a control element may includes: selecting a point or area as a location in a received image; and referencing the map to identify the control element at the location. The map may include multiple levels of window classes and identifying a control element in the map by reference to the image may include hit testing each level of window class.

Receiving a control element input instruction may include: displaying an instruction template for the type of control element identified; receiving the input instructing in the instruction template; and creating a control element input instruction.

Transmitting the control element input instruction to the host computer system may include transmitting one or more of the group of: a control element type, a control element location, a control element identifier, and a remote user identifier. Transmitting the control element input instruction may transmit a returned original image and/or map to verify that the application user interface at the host computer system is still current.

The method may include transmitting a holding indication to the host computer system and any other remote computer systems that a control element input instruction is currently being input at the remote computer system.

According to another aspect of the present invention there is provided a system for providing instructions during remote viewing of a user interface, comprising: a host computer system comprising a processor and a memory configured to provide computer program instructions to the processor to execute the function of components and including a display component for displaying one or more application user interfaces; and a host instruction component including: an image capturing component for capturing an image of one or more application user interfaces as displayed at the host computer system; a serializing component for serializing data of each application user interface to provide a map of each window class and containers and/or control elements of the window class, wherein a container has attributes and child control elements; a transmitting component for transmitting the captured image and the map to a remote computer system; and a receiving component for receiving control element input instruction from a remote computer system for instructing an interaction with a control element for display in a context of the control element in the application user interface.

The host instruction component may include an instruction enabling component enabling the control element input instructions to be activated in or entered into the application user interface further to confirmation input from a user of the application user interface.

The receiving component may include a verification component for receiving an element input instruction from a remote computer system with a returned original image and/or map to verify that the application user interface is still current and the instruction is applicable to the application user interface.

The host instruction component may include a holding component for receiving a holding indication that a control element input instruction from a remote computer system is currently being input at the remote computer system.

According to another aspect of the present invention there is provided a system for providing instructions during remote viewing of a user interface, comprising: an instructor computer system comprising a processor and a memory configured to provide computer program instructions to the processor to execute the function of components and including a display component; and an instruction providing component including: a receiving component for receiving an image of one or more application user interfaces as displayed at a host computer system and a map serializing the data of each application user interface including each window class and containers and/or control elements of the window class, wherein a container has attributes and child control elements; a control element identifying component for identifying a control element in the map by reference to the image; an input component for receiving input of a control element input instruction from a user of the instructor computer system; and a transmitting component for transmitting the control element input instruction to the host computer system.

The control element identifying component may include a map level component for identifying a control element in a map including multiple levels of window classes including hit testing each level of window class.

The input component may include a template component for displaying an instruction template for the type of control element identified and receiving the input instructing in the instruction template.

The instruction providing component may include a holding component for transmitting a holding indication to the host computer system and any other remote computer systems that a control element input instruction is currently being input at the remote computer system.

According to another aspect of the present invention there is provided a computer program product for providing hyperlinks in a presentation to be viewed remotely, the computer program product comprising a computer readable storage medium having program instructions embodied therewith, the program instructions executable by a processor to cause the processor to: capture an image of one or more application user interfaces as displayed at the host computer system; serialize data of each application user interface to provide a map of each window class and containers and/or control elements of the window class, wherein a container has attributes and child control elements; transmit the captured image and the map to a remote computer system; and receive control element input instruction from a remote computer system for instructing an interaction with a control element for display in a context of the control element in the application user interface.

According to another aspect of the present invention there is provided a computer program product for providing hyperlinks in a presentation to be viewed remotely, the computer program product comprising a computer readable storage medium having program instructions embodied therewith, the program instructions executable by a processor to cause the processor to: receive an image of one or more application user interfaces as displayed at a host computer system and a map serializing the data of each application user interface including each window class and containers and/or control elements of the window class, wherein a container has attributes and child control elements; identify a control element in the map by reference to the image; receive a control element input instruction from a user of the instructor computer system; and transmit the control element input instruction to the host computer system.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system enables user of a host computer system to receive instructions from user of a remote computer system relating to interaction with control elements on the host computer system display. The instructions are tailored to the actual display contents of the host computer system and provided in the context of the display contents without the need to provide control to the remote user of the host computer system.

The method and system at the host computer system send an image of the display to one or more remote computer systems along with serialized data relating to location, size and type of control elements or widgets of the display. The entire screen or only certain applications or windows displayed on the screen may be captured in this way.

A remote user may selecting an area of the display and may sending instructions to the user of the host computer system in relation to a particular control element in the selected area of the display. When remote users click on an area of the image, the control element is identified accurately. The inputs from the remote users are then sent back to the host machine.

The host computer system may display the instruction next to or with a pointer to the control element. The host user may select the instructions being displayed such that the data from the instructions may be entered into corresponding field of the control element. Multiple remote users may provide instructions simultaneously to a host user. In this way the host user interacts with their computer under the instruction of one or more remote user.

Figure 1:
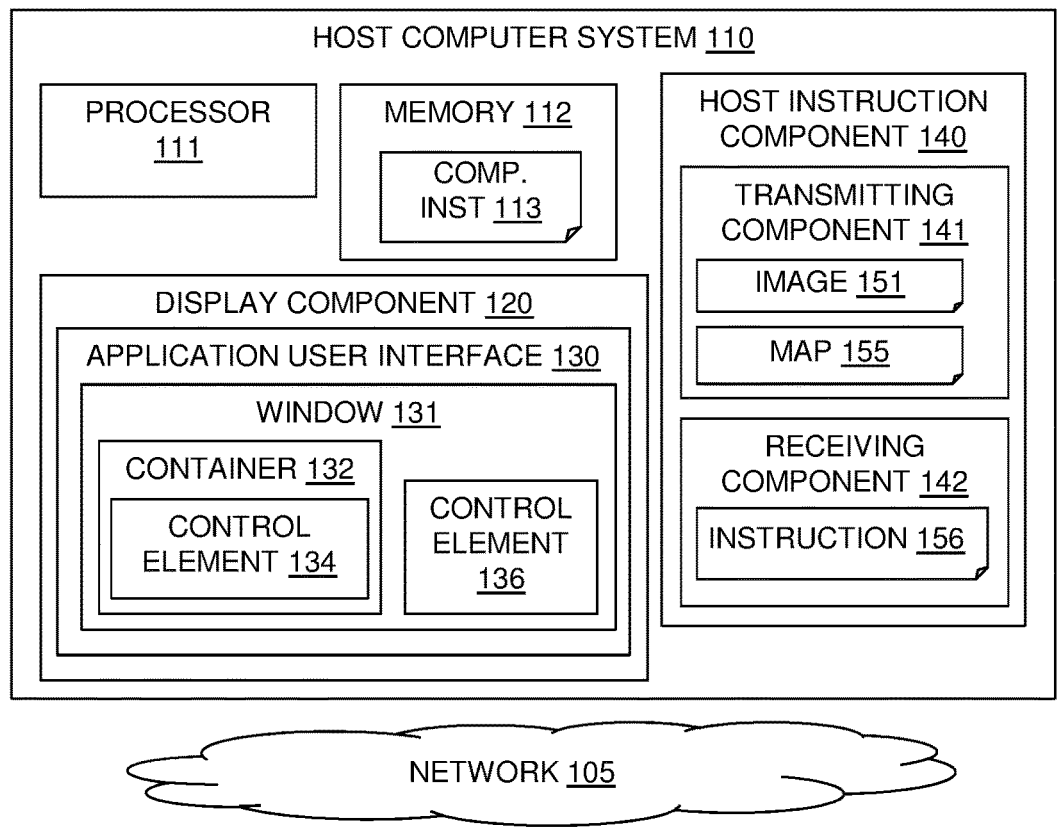
FIG. 1 is a block diagram of an example embodiment of a system in accordance with the present invention.
Figure 1:
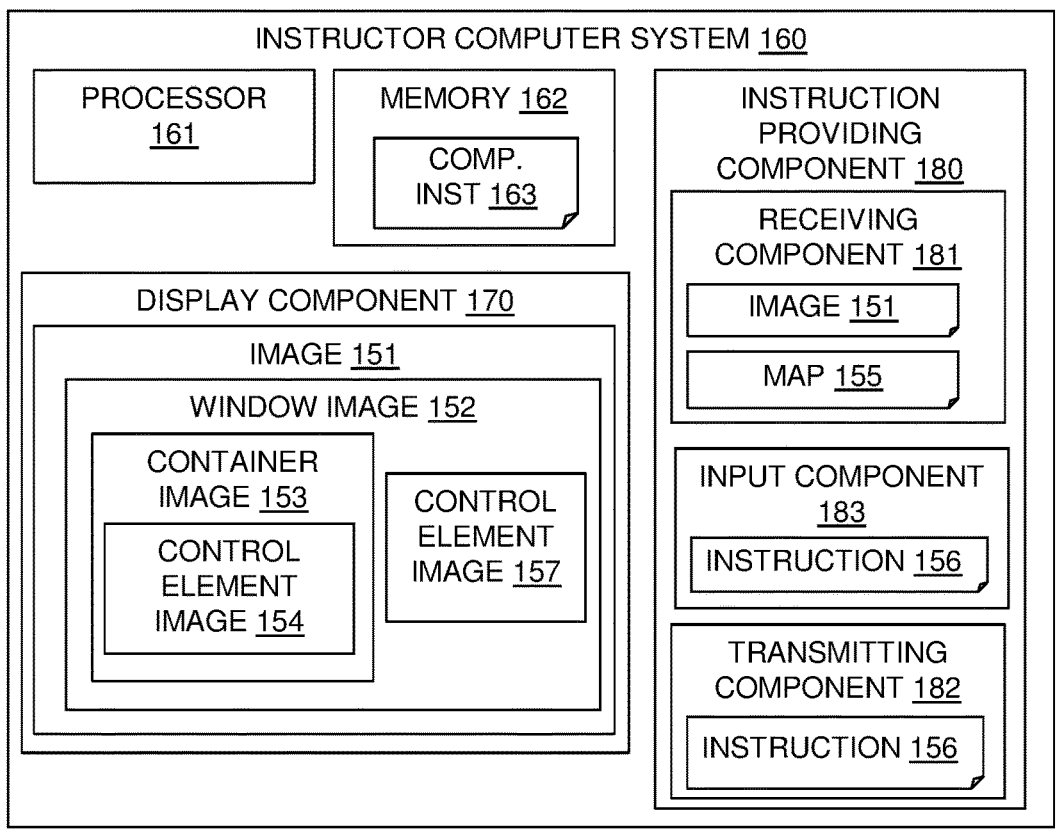

Referring to FIG. 1, a block diagram shows an example system 100 in which the described system and method may be implemented. A host computer system 110 may include at least one processor 111, a hardware module, or a circuit for executing the functions of the described components which may be software units executing on the at least one processor. Memory 112 may be configured to provide computer instructions 113 to the at least one processor 111 to carry out the functionality of the components.

The host computer system 110 may include a display component 120 for providing one or more application user interfaces 130. The application user interfaces 130 may include an operating user interface, installed application user interfaces, web services user interfaces, or other program user interfaces. The application user interfaces 130 may be graphical user interfaces, web user interfaces, command line interfaces, etc. The host computer system 110 may be a personal computer, a server, a handheld computing device, or any other form of computer system that may display user interfaces.

An application user interface 130 may include one or more windows 131, each having multiple control elements 134, 136. The control elements 134, 136 may be contained in containers 132. A window 131 may include a hierarchy of containers 132 and control elements 134, 136.

A window is an area of the display with its contents displayed independently from the rest of the screen and consisting of a visual area containing some of the graphical user interface elements of the program it belongs to. A window may be placed in front of or behind another window in the display.

A control element (also referred to as a control or widget) is a graphical user interface element of interaction. Control elements are software components that a computer uses to interact with an application. Each control element may enable a type of user-computer interaction and appears as a visible part of an application user interface. A container may be a form of control element that includes a group of other control elements, for example, a container may be a window or panel providing multiple options. Examples of control elements include buttons, scroll bars, text boxes, labels, check boxes, etc.

The described system provides a host instruction component 140 at the host computer system 110. The host instruction component 140 includes a transmitting component 141 for transmitting an image 151 of the one or more application user interfaces 130 displayed at the display component 120 of the host computer system 110. The transmitting component 141 also transmits a map 155 of the serialized data of the location and size of the containers 132 and control elements 134, 136 in each application user interface 130. Further details of these aspects are given below. In this way, the host instruction component 140 transmits details of the application user interfaces 130 on display to one or more remote instructor computer systems 160.

Multiple instructor computer systems 160 may be in communication with the host computer system 110 via a network 105 and may receive information from the host computer system 110 in order to enable them to provide instructions to the host computer system 110 relating to application user interfaces 130 displayed at the host computer system 110. An instructor computer system 160 may include at least one processor 161, a hardware module, or a circuit for executing the functions of the described components which may be software units executing on the at least one processor. Memory 162 may be configured to provide computer instructions 163 to the at least one processor 161 to carry out the functionality of the components.

The host computer system 110 may include the functionality of an instructor computer system 160 and visa versa so that a computer system may operate as a host or instructor as required in a given situation.

An instructor computer system 160 may include an instruction providing component 180 including a receiving component 181 for receiving the image 151 and the map 155 of the application user interfaces 130 as transmitted by the host instruction component 140. The instructor computer system 160 may include a display component 170 for displaying the received image 151 including images of the windows 152, containers 153 and control elements 154, 157 of the application user interfaces 130. The instruction providing component 180 may include an input component 183 for receiving and processing an instruction 156 input by a user of the instructor computer system 160 in relation to a control element image 155. The instruction providing component 180 may include a transmitting component 182 for transmitting the instruction 156 to the receiving component 142 of the host instruction component 140 of the host computer system 110. Further details of these components are described below.

In one embodiment, the application user interfaces 130 of the host computer system 110 may be displayed at the instructor computer systems 160 using a display component 170 of a web conferencing system and the web conferencing system may display the received image 151 and enable instruction input as described herein.

Figure 2A:
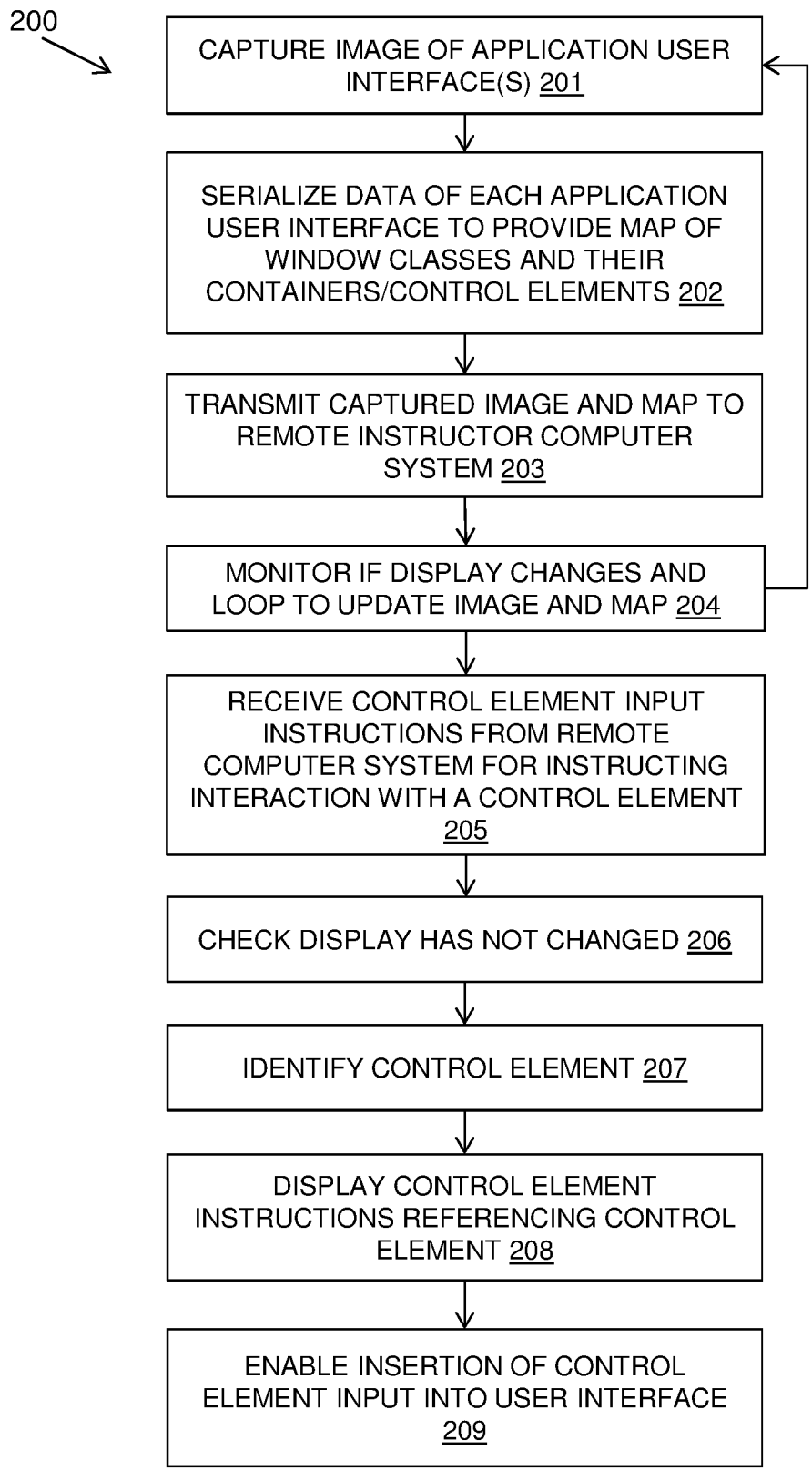
FIG. 2A is a flow diagram of an example embodiment of an aspect of a method in accordance with the present invention carried out at a host computer system.

Referring to FIG. 2A, a flow diagram 200 shows an example embodiment of an aspect of the described method for providing instructions during remote viewing of a user interface. The method is carried out at a host computer system 110 that receives the instructions from one or more remote instructor computer systems 160.

The method may capture 201 an image of one or more application user interfaces displayed by the host computer system 110. Capturing 201 an image may use a screenshot to create a digital image of what is visible on the display component 120. This may an image of one or more application user interfaces 130 or an entire screen.

The method may serialize 202 the data of the each application user interface captured in the image to provide a map of window classes and their containers and control elements. A serializer component may walk the active display of each application user interface. From the active display, the top level components will be window classes with size and location. Each window class may then be analyzed for its children, which may be control elements or containers. A container has children control elements and can also have attributes such as the title (for example, if it is a group box), or items (for example, if it is a tree, table or list). Control elements and containers have size and location; the location may be provided relative to the parent container. The map may also include types and identifiers of the control elements.

Serializing may use calls to the windowing operating system. The ability to determine the graph of a window and its children is available in operating systems. For example, Microsoft Foundation Class Library (MFC) for Windows operating systems (Windows is a trademark of Microsoft Corporation), Carbon application programming interface for Mac operating systems (Carbon and Mac are trademarks of Apple Inc.), and Linux operating systems through GTX (Linux is a trademark of Linus Torvalds).

The captured image and the map may be transmitted 203 to one or more remote instructor computer systems 160. In one embodiment, this may be incorporated into a web conferencing system.

The display of the host computer system 110 may be monitored 204 to determine if this changes. When the display changes, a new image may be captured 201 and a new map serialized 202. The new set may be transmitted 203 to the remote instructor computer systems.

The host computer system 110 may receive 205 control element input instructions from any of the remote instructor computer system 160 for instructing interaction with a control element of an application user interface.

The host computer system 110 may check 206 that the display has not changed and the captured image and map to which the input instruction relates is still current at the host computer system 110. In one embodiment, this may be checked by receiving from the instructor computer system 160 the instruction input together with the returned original map as received at the instructor computer system 160 and used to generate the instruction input. In another embodiment, the captured image may be returned to the host computer system 110 for verification.

The map or image or both may be used to compare whether the display at the host computer system 110 is the one as displayed at the instructor computer system 160. If the display matches, the instructions are then used to identify 207 the control element on the host computer system 110 by matching the location and control element identifier. This may be by referencing the control elements in the map. Identification of the control may be based on an identifier in the input instruction. The identifier may include one or more of: the type of control element, the location in the map, a control element identifier, and any label of the control element.

The control element input instructions may be displayed 208 referencing the control element in the application user interface in the context of the control element. The referencing may be by displaying 208 the control element input instructions adjacent the control element, for example in a pop-up window on the application user interface that shows the input instruction alongside the control element, or by an arrow pointing to the control element.

The method may enable 209 the user of the host computer system to activate or insert the control element input instruction into the control element of the application user interface, for example, by selecting a provided acceptance control element.

In one embodiment, the host computer system 110 may create a widget such as a pop-up window adjacent to the control element. The pop-up window may include the input instruction (for example, text to input or the option to select) and an acceptance input (for example, an "OK" button). The pop-up window may also identify the remote user who provided the input instruction. The input instruction may be able to be accepted directly into the control element by using the acceptance input. In some embodiments, multiple instructions against one control element may be received from multiple remote users. These instructions may be displayed in multiple pop-up windows with one for each remote user.

Figure 2B:
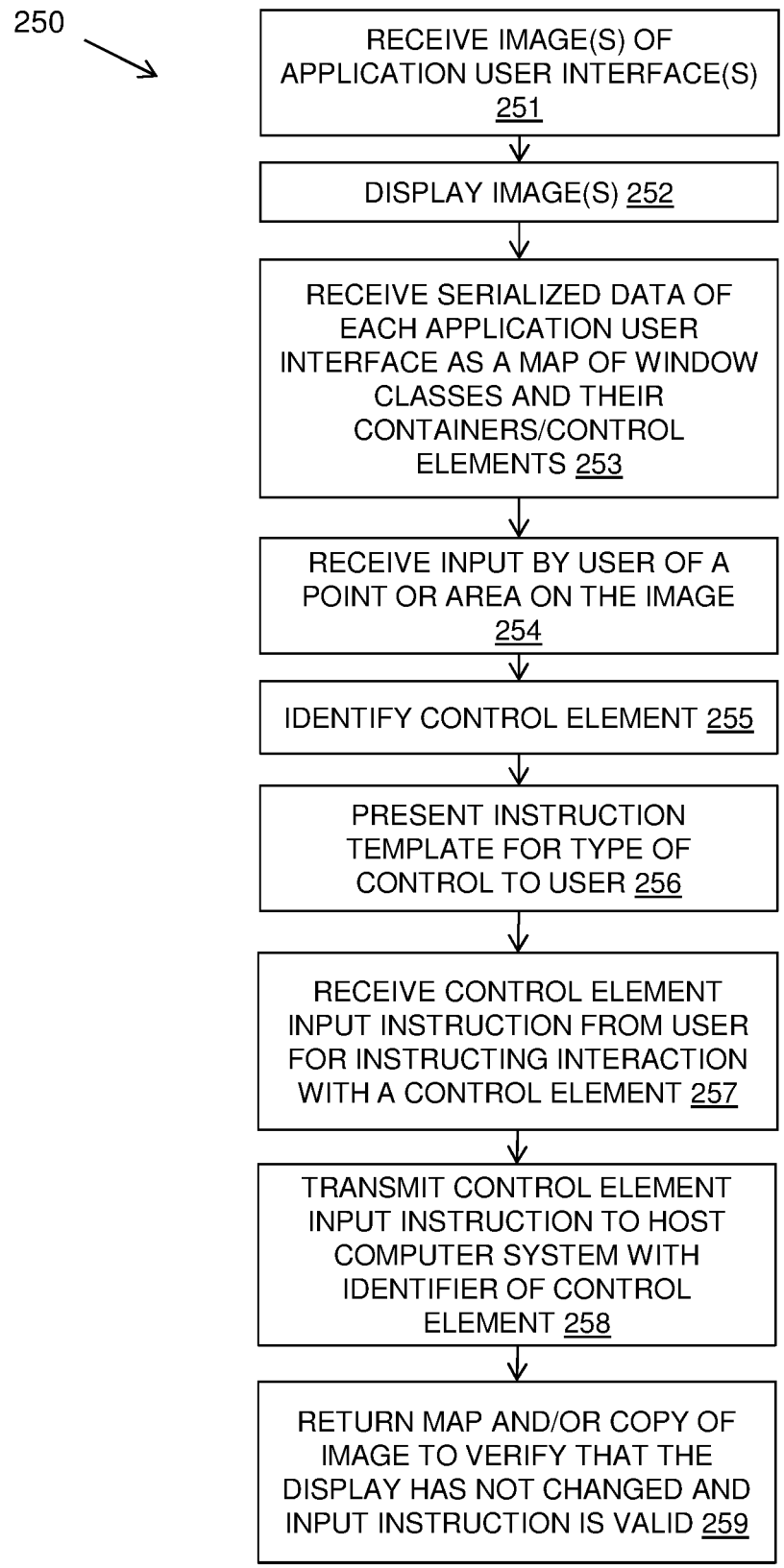
FIG. 2B is a flow diagram of an example embodiment of another aspect of a method in accordance with the present invention carried out at an instructor computer system.

Referring to FIG. 2B, a flow diagram 250 shows an example embodiment of an aspect of the described method for providing instructions during remote viewing of a user interface. The method is carried out at an instructor computer system 160 that provides instructions to a host computer systems 110.

The method may receive 251 an image of one or more application user interfaces, which may be displayed 252 at the instructor computer system 160. The received image shows the one or more user interfaces or the entire screen as displayed at the host computer system 110. Serialized data may be received 253 for each application user interface as a map of the window classes and their containers and control elements.

In one embodiment, the application user interfaces 130 of the host computer system 110 may be displayed at the instructor computer systems 160 using a display component 170 of a web conferencing system and the web conferencing system may display the received image instead of a web conference feed in the display component 170.

An input by a user at the instructor computer system may be received 254 as a selection of a point or an area of the displayed image relating to a control element the user wishes to provide an instruction for. The method may identify 255 the control element by referencing the location on the displayed image and the map of the serialized data.

The type of control element may also be identified and an appropriate instruction template presented 256 to the user for the type of control element. A control element input instruction may be received 257 from the user input into the instruction template.

A user of the remote instructor computer systems is able to select an area of the display and the instruction providing component may look at the map of the display control elements to determine which the control element lies beneath the cursor. If it is a text area, then the user may be given the option of providing instructions for a text box such as "type _____" or "Press _____ key". If the control element is a button, the user may be able to give instructions relevant for a button such as "press Enter".

The control element input instruction may be transmitted 258 to the host computer system with an identifier of the control element. For example, details of the location and control element type may be provided. The input instruction may include the text input or the option specified by the remote user depending on the type of the control. The instruction may also include the remote user identifier so that the user of the host computer system knows who has made the input instruction suggestion. The location and the type of the control element may be used to match a control element at the host computer system by referencing the map that was generated and sent to the instructor computer system.

A return map and/or a copy of the image may be returned 259 to the host computer system with the input instruction in order to verify that the same content is still being displayed by the host computer system and therefore the instruction input is valid for the display.

For the user of the host computer system, when they receive the instructions, rather than the instruction just being shown in a separate chat area, the instruction appears in the context of the control element. The user can see what control assistance is being provided for, and they can also accept the instruction resulting in the text being entered, the button being pressed, etc.

In one embodiment, an instructing user of a remote instructor computer system may provide input instructions for all the control elements of a container in a single instruction.

In one embodiment, the host computer system may serialize the data of the application user interfaces into Extensible Markup Language (XML) with the control type, size and location.

Figure 4A:
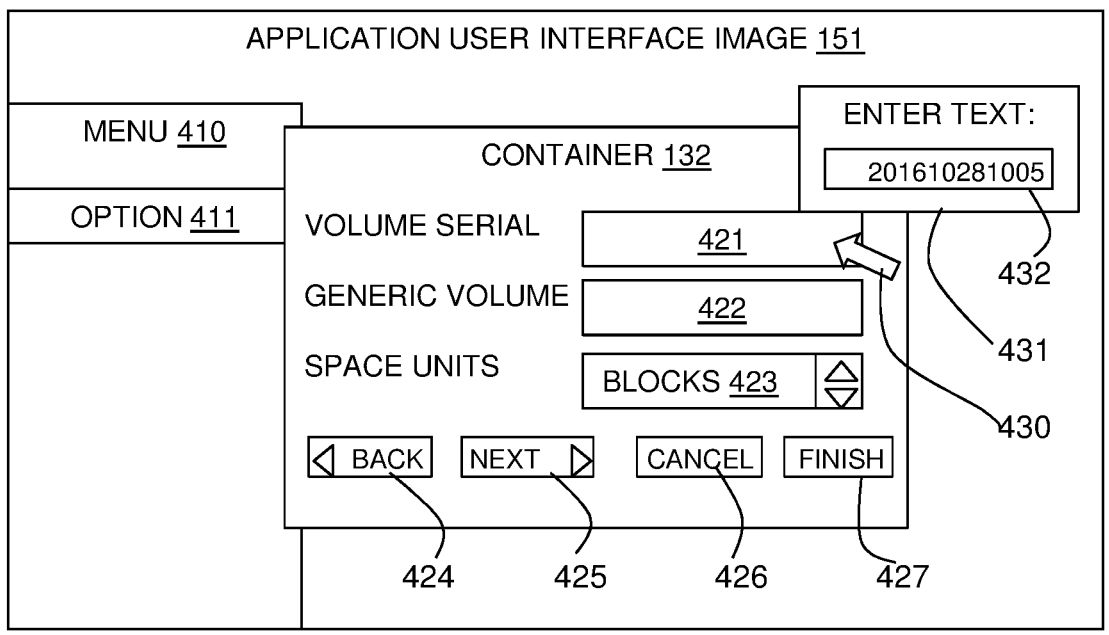
FIGS. 4A and 4B are schematic diagrams illustrating an example of providing instructions remotely in accordance with the present invention.
Figure 4B:
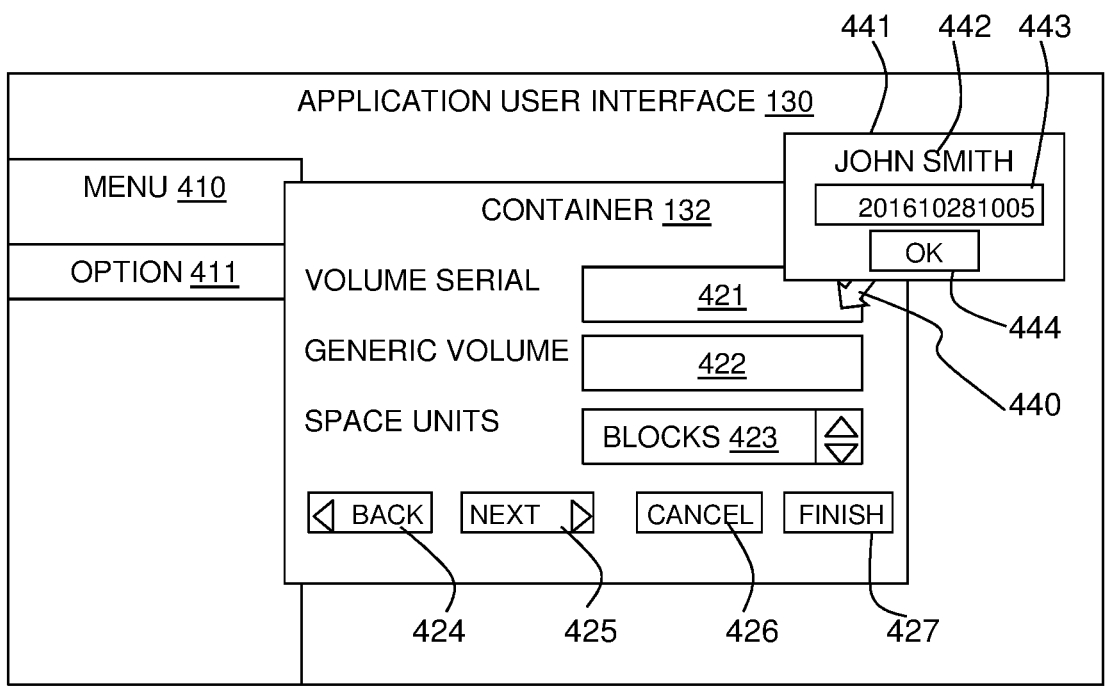

An example of the serialized data for an application user interface 130 of a wizard page such as the one being displayed in FIG. 4B would be:

```
<Window location=10,10 size=70,130>
  <Container location=0,0 size=70,20>
  ....... (The controls for title bar of the wizard) .....
  </Container>
  <Container location=0,20 size=70,80>
    <Label location=5,5 size=20,10 text="Volume serial:"/>
    <Text location=30,5 size=30,10/>
    <Text location=5,22 size=20,10 text=Generic unit"/>
    <Text location=30,22 size=30,10/>
  ............
  </Container>
  <Container location=0,80 size=100,20>
    <Button location=15,3 size=20,7 label="Back"/>
    <Button location=40,3 size=20,7 label="Next"/>
    <Button location=55,3 size=20,7 label="Cancel"/>
    <Button location=70,3 size=20,7 label="Finish"/>
  </Container>
</Window>
```

A single application at the host computer system 110 may be captured and sent to the remote instructor computer systems. Optionally, several applications may be selected to be captured and sent. In one embodiment, an entire display at the host computer system 110 may be captured and sent to the remote instructor computer systems.

If multiple application user interfaces or an entire display is being captured, then the serialized data for every application user interface is created and sent to the instructor computer systems. For each active window the z order is included in the serialized data. The z order is the order that the windows are placed on top of each other, so that an application that is in front of everything has a z order of zero, the application behind that has a z order of 1. This is so that the mapping between locations and control elements does not give a false positive if a control element is behind another. For any window it is possible to work out whether it is being masked or obscured by another by asking for the bounds of the paint area.

Figure 3A:
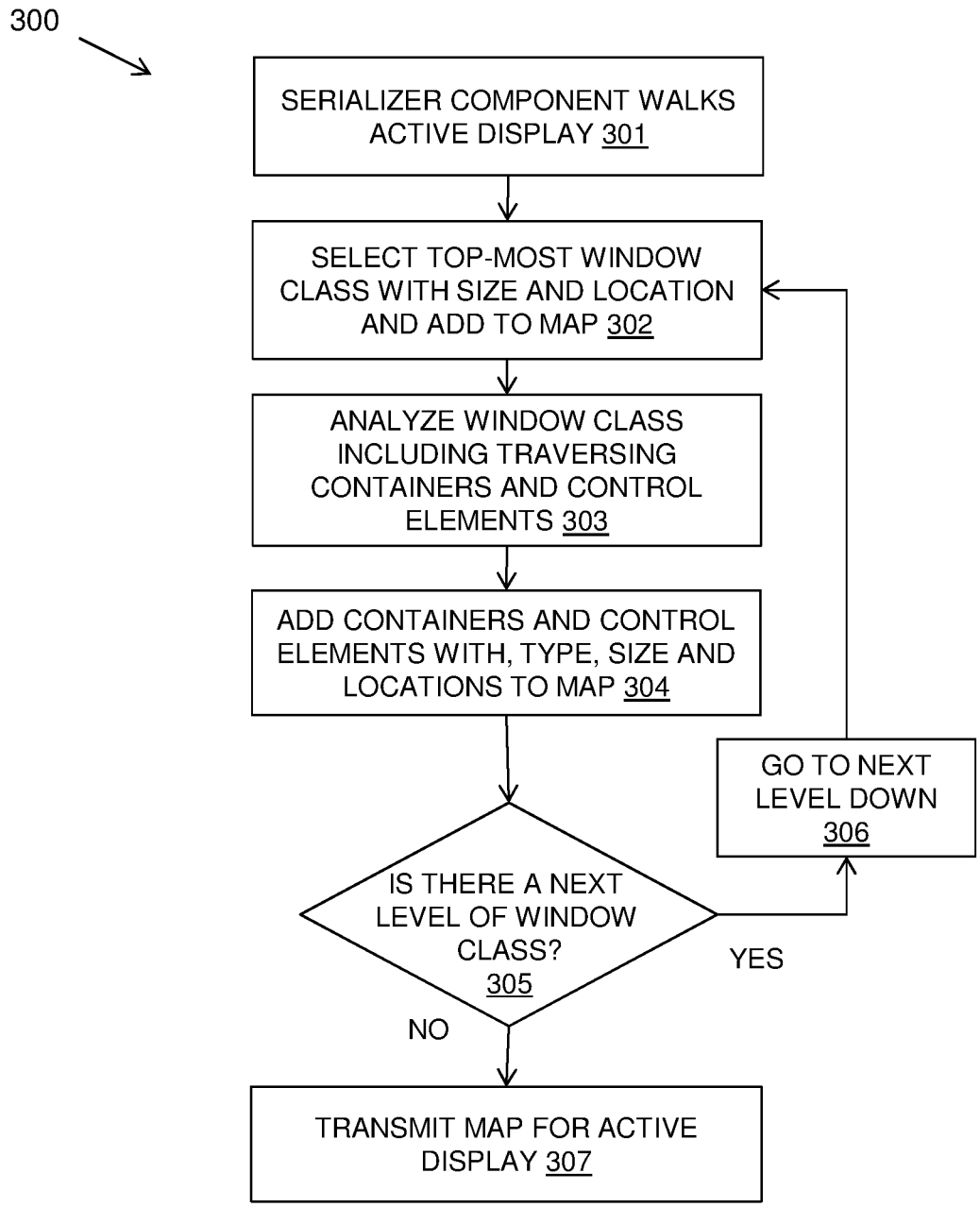
FIG. 3A is a flow diagram of a further example embodiment of an aspect of a method in accordance with the present invention carried out at a host computer system.

Referring to FIG. 3A, a flow diagram 300 shows an example embodiment of an aspect of the described method for providing instructions as carried out at a host computer system 110 for multiple application user interface windows or an entire display at the host computer system 110.

The serializer component may walk 301 the active display. The active display may be the application user interfaces selected to share with the remote instructor system. The user at the host computer system may choose to share one or more application user interfaces or to share the entire screen.

Windows may be positioned on top of each other and the top-most window may obscure windows that are beneath it. Window order is known as a z order (with x and y being left to right and top to bottom axis) and z being out of the screen.

A top-most window class is selected 302 and added to the map with its size and location. The window class may be analyzed 303 including traversing containers and control elements within the window. The containers and control element with their type, size and location are added 304 to the map.

It may be determined 305 if there is a next level of window class in the active display. If so, the method goes to the next level down 306 in the display and the method may be repeated to build 302, 303, 304 the map.

If it is determined 305 that there is not next level of window class, the map may be transmitted 307 for the active display.

Figure 3B:
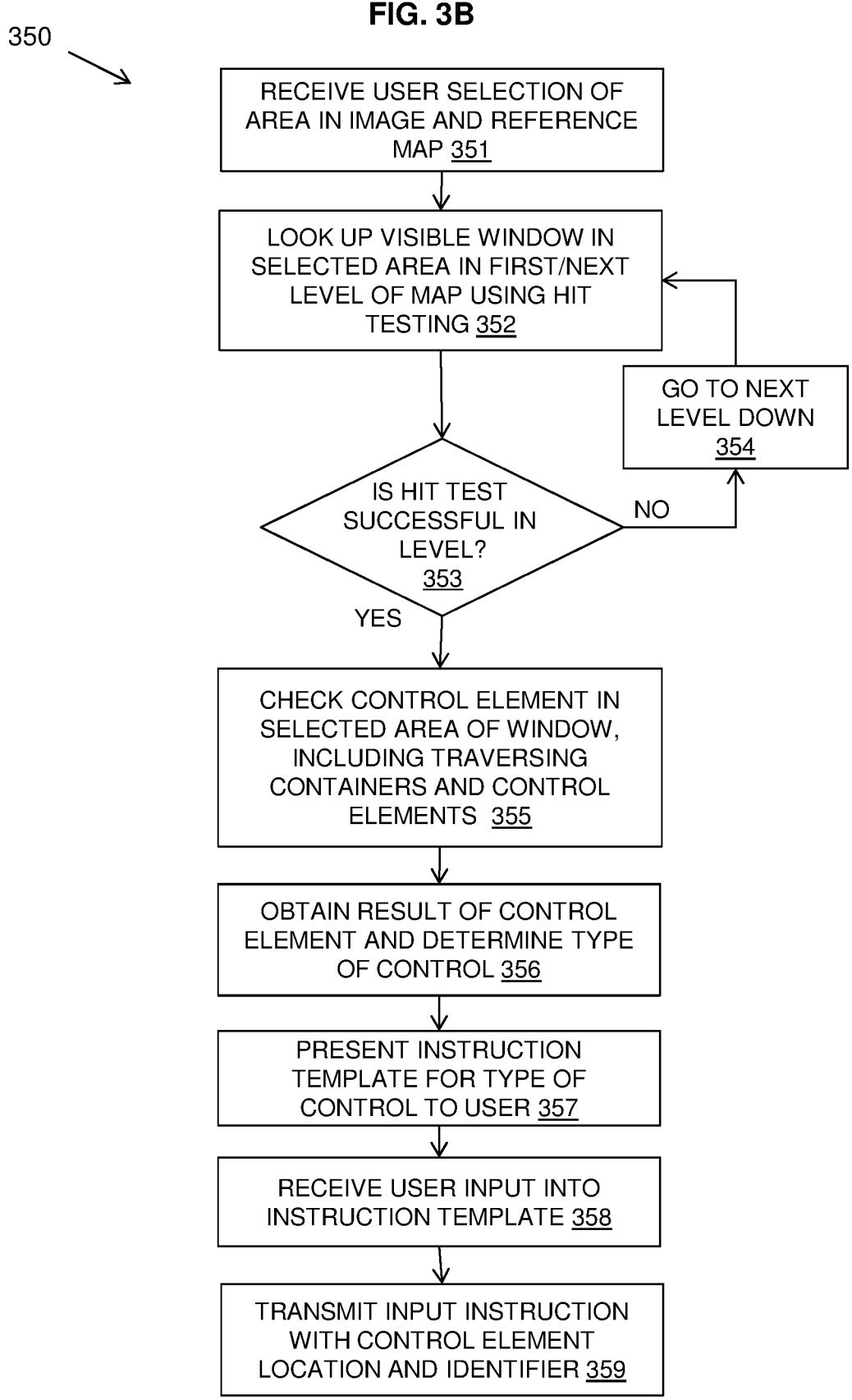
FIG. 3B is a flow diagram of a further example embodiment of another aspect of a method in accordance with the present invention carried out at an instructor computer system.

Referring to FIG. 3B, a flow diagram 350 shows an example embodiment of an aspect of the described method for providing instructions as carried out at an instructor computer system 160 for multiple application user interface windows or an entire display at the host computer system 110.

The method may receive 351 a user selection of a point or an area in the displayed captured image and may reference the serialized data map in order to identify a control element at the point or in the area.

The method may look up the visible window in the selected area of the first level of the map using hit testing. The first level will be a level with a z order of zero.

The technique of "hit testing" is where each window is asked whether the coordinates (x,y) of the cursor are contained within its currently painted area by comparing the window's location and size with the location of the cursor to see whether it lies within its visible painted bounding box. The order that windows are asked is in z order with the outer-most "on top" window asked first, followed by the windows beneath it. The first window that contains the cursor coordinates, x and y, within its bounding box will be the window that is visible to the user.

It may be determined 353 if the hit test is successful in the window level. If it is not successful, the method progresses to check the next level down 354.

If the hit test is successful for a window, then the children in the target window are checked 355 and the window's containers and control elements are asked whether they contain the cursor. Only one control element may give a positive hit result at any given level for whether the cursor is contained within its bounds as the tree of containers and controls are traversed recursively. This is done in reverse z order so controls on top are asked before controls that they obscure. The first control that is found that contains the cursor x and y location in its rectangle is the one beneath the cursor. This is known as hit testing.

The result of the hit test is that one, or none, control elements will answer that they are the one that the cursor has been pointed at.

In this way the method may obtain 355 the result of the control element in the selected area that is hit and may determine the type of the control by looking up the control element in the map.

An instruction template for the type of control may be presented 357 to the user and user input may be received 358 in the instruction template. The instruction input may be transmitted 359 with the control element location and identifier to the host computer system.

When the instructor finishes his/her input by pressing 'Enter', the following example XML is constructed to indicate the input instruction from this user.

```
<Window location=10,10 size=70,130 instructor=
    "John Smith" >
  <Container location=0,20 size=70,80>
    <Label location=5,5 size=20,10 text="Volume serial:"/>
    <Text location=30,5 size=30,10 input="201610280005"/>
  </Container>
  <Container location=0,80 size=100,20>
    <Button location=70,3 size=20,7 label="Finish" clicked="yes"/>
  </Container>
</Window>
```

In this example, two control elements are identified, a text input and a "Finish" button. Each control element is identified by its container location, control element location, and label name. The instructing user is also identified.

In another example XML a control element identifier may be generated and included in the XML.

Referring to FIGS. 4A and 4B, an example application user interface 130 is shown. FIG. 4A shows the image 151 of the application user interface as presented at an instructor computer system and FIG. 4B shows the application user interface 130 at the host computer system. The application user interface 130 has a menu panel 410 in which an option 411 has been selected resulting in a window for a container 132 being displayed. The container 132 includes labels with associated text boxes 421, 422 and a label with a drop down menu 423. Buttons 424-427 are provided for back, next, cancel and finish operations.

FIG. 4A shows that, a control element 421 in the image 151 of the application user interface is selected by the instructing user by pointing a cursor 430 at the control element 421. An instruction template 431 for the type of control element is displayed with a set of options for instructions for how to use the keyboard or mouse, for example, a text area has the instruction "Enter text: . . . " or "Type . . . ". In this case, the instructing user has an area to type the text they wish to be entered into the text box. The instructing user can then type the value, for example "201610281005" in a text area on their screen and press "Enter" to signal they have finished.

If the control element beneath the cursor 430 were a button, then the user would get a different set of actions, such as "Click" or "Double Click". If the control element beneath the cursor were a scroll bar then the user would get a different set of actions such as where the scroll bar should be moved to. The set of actions is determined by knowing the control element type.

As shown in FIG. 4B, for the host user who is displaying their application at the host computer system, when the host instruction component receives the input instructions these contain, not only the text, but the control location they are relevant to as well as the control element identifier. This is used to locate the control and open a pop-up 441 that shows the instructions alongside the control element 421 in the application user interface 130. Depending on the control element, these may be able to be applied directly (such as typing into a text field, or pressing a button) in which case an "OK" button 444 may be provided allowing the host user of the application to just accept and apply the instructions from the instructing user who provided the assistance.

In the example shown in FIG. 4B, an instructing user "John Smith" is identified 442 as providing the instruction and the text value 443 of "201610281005" is provided in the instruction. The host user can see which control element 421 it is for with a visual indication 440 (such as an arrow) and they can press the "OK" button 444 to accept and have the value entered into their text field in their application user interface 130.

There may be multiple instructing users with instructor computer systems on which the application user interface 130 may be viewed using the described system. When one of the instructor starts to provide an instruction by making an input at their instructor computer system, other instructing users and the host user may receive notification that one of the observers is typing with the name and an indicator that an action is pending, such as " . . . " against the control element. For example, "John Smith . . . " in this example.

When one of the instructors points the cursor in an area, which is detected by his/her instructor computer system, the system creates and sends the following example XML to the host computer system along with the original image. The host computer system determines that the current display matches the original image and then broadcasts the XML to other computers.

```
<Window location=10,10 size=70,130 instructor=
        "John Smith" >
    <Container location=0,20 size=70,80>
        <Label location=5,5 size=20,10 text="Volume serial:"/>
        <Text location=30,5 size=30,10 pendingforinput="yes"/>
    </Container>
</Window>
```

When the instructing user has finished typing all the users may see the instruction and they are also able to add or comment in the same way. So that in the case of a multi-user conference, the host user displaying their screen may get collaborative input from everyone as to the correct action to take. This can be useful in an environment where more than one user is helping the primary user sharing their screen with a problem or issue they need assistance on how to drive their application user interface.

When the instructing user sends their instruction back to the host user, they also send back the map and image that was shared with them. This is compared against the host user's application user interfaces. If the host user is showing a different application, perhaps the next page of a wizard, then the instruction is not applicable and the user will not type or press a button against the wrong user interface element. As soon as a instructing user starts to provide an instruction, the host sharing will see the " . . . " to indicate that a user is suggesting their instruction. This allows the host user to wait until the instruction has been completed and sent, so the interaction model is one where the instructors can "pause" the host user, type an instruction, send the instruction, and have the application being displayed compared to that which the instruction was created, with accuracy reducing errors and increasing the skill and knowledge sharing between the host and the instructors.

Figure 5A:
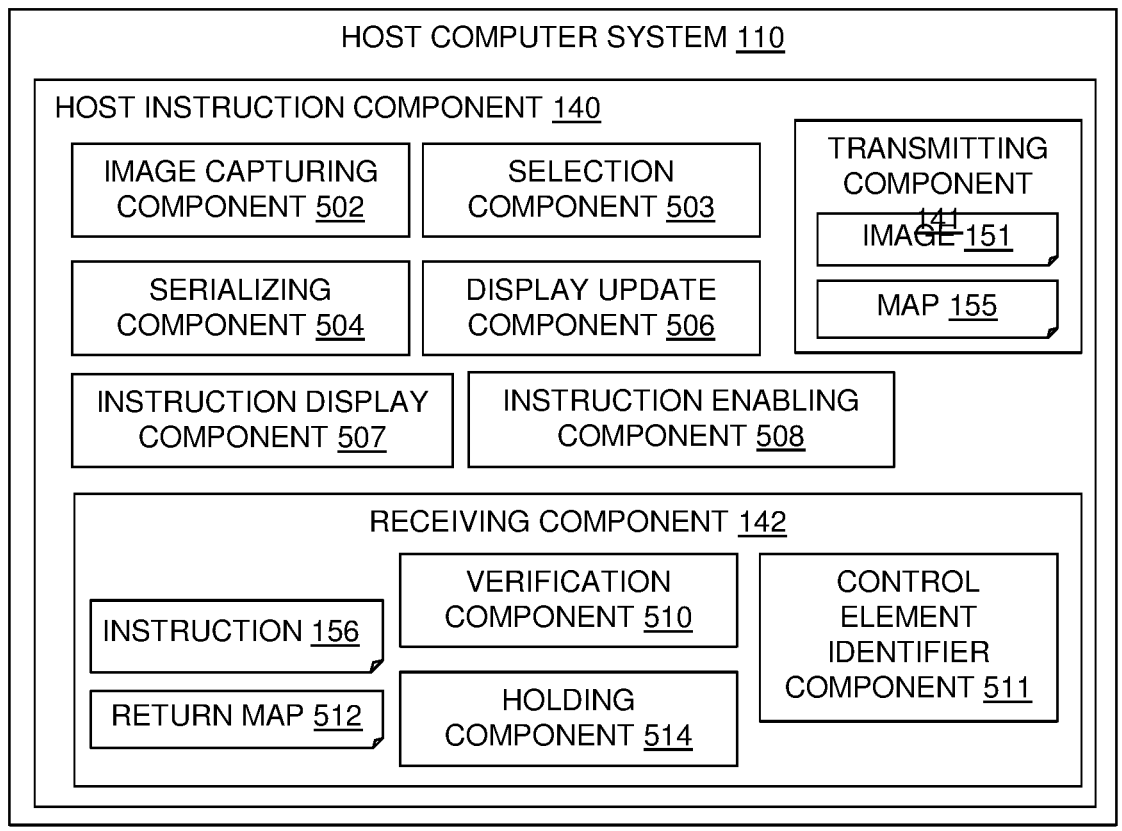
FIG. 5A is a block diagram of an example embodiment of an aspect of a system in accordance with the present invention.

Referring to FIG. 5A, a block diagram shows further components of an example embodiment of the host instruction component 140 of the host computer system 110 provided in association with a display component 120 as shown in FIG. 1.

The host instruction component 140 may include an image capturing component 502 for capturing an image 151 of one or more application user interfaces as displayed at the host computer system 110. The host instruction component 140 may include a selection component 503 for selection of the application user interfaces to be captured this may enable a user of the host computer system 110 to select one or more application user interfaces to share or may select an entire screen display. The host instruction component 140 may also include a serializing component 504 for serializing data of each application user interface to provide a map 155 of each window class and containers and/or control elements of the window class.

The image capturing component 502 and the serializing component 504 may supply the image 151 and map 155 to the transmitting component 141 for transmitting the captured image 151 and the map 155 to a remote instructor computer system 160.

The host instruction component 140 may include a display update component 506 for monitoring the display of the application user interfaces at the host computer system 110 and updating the captured image 151 and map 155 when the display changes.

The host instruction component 140 may include a receiving component 142 for receiving a control element input instruction 156 from a remote instructor computer system 160 for instructing an interaction with a control element at the display of the host computer system 110.

The receiving component 142 may include a verification component 510 for receiving an element input instruction from a remote computer system with a returned original image and/or map 512 to verify that the application user interface is still current and the instruction is applicable to the application user interface. The verification component 510 may also be used to verify that a holding indication is still valid for the displayed application user interface.

The receiving component 142 may include a control element identifier component 511 for identifying a control element in the displayed application user interface from the information included in the received input instruction 156. The control element identifier component 511 may reference the map 155 to identify the control element. In one embodiment, the input instruction 156 may include a location, type of control element, and label that may be used to identify the control element. An indicator of the z level of the application user interface may also be included.

The receiving component 142 may include a holding component 514 for receiving a holding indication that an input instruction 156 is in the process of being generated at an instructor computer system 160. The holding component 514 may display a holding notice in the context of a control element referenced in the holding indication prior to the input instruction 156 being received and displayed.

The host instruction component 140 may include an instruction display component 507 for displaying an input instruction in a context of the control element to which it refers in the application user interface.

The host instruction component 140 may include an instruction enabling component 508 enabling the control element input instruction to be activated or entered into the application user interface further to a confirmation input from a user of the application user interface.

Figure 5B:
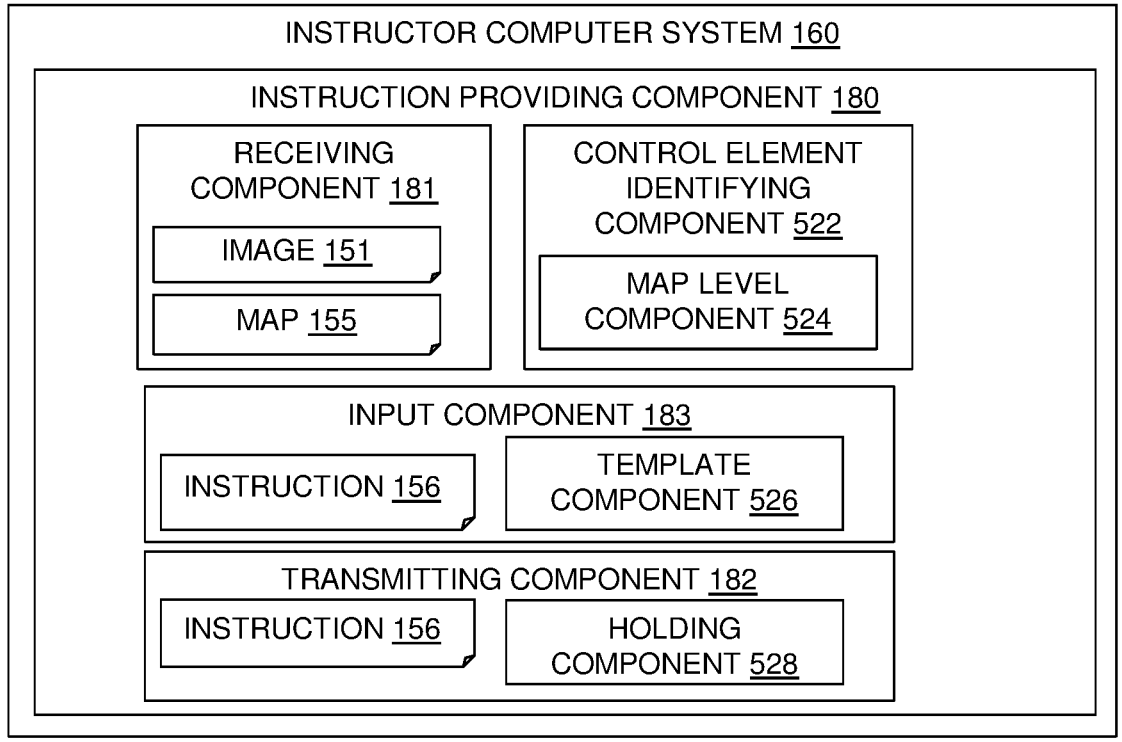
FIG. 5B is a block diagram of an example embodiment of another aspect of a system in accordance with the present invention.

Referring to FIG. 5B, a block diagram shows further components of an example embodiment of the instruction providing component 180 of an instructor computer system 160 provided in association with a display component 170 as shown in FIG. 1.

The instruction providing component 180 may include a receiving component 181 for receiving an image 151 of one or more application user interfaces as displayed at a host computer system 110 and a map 155 serializing the data of each application user interface including each window class and containers and/or control elements of the window class.

The instruction providing component 180 may include a control element identifying component 522 for identifying a control element in the map by reference to the image. The control element identifying component 522 may include a map level component 524 for identifying a control element in a map including multiple levels of window classes including hit testing each level of window class.

The instruction providing component 180 may include an input component 183 for receiving a control element input instruction 156 from a user of the instructor computer system. The instruction providing component 180 may include a transmitting component 182 for transmitting the control element input instruction 156 to the host computer system.

The input component 183 may include a template component 526 for displaying an instruction template for the type of control element identified and receiving the input instructing in the instruction template.

The transmitting component 182 may include a holding component 528 for transmitting a holding indication to the host computer system and any other remote computer systems, that a control element input instruction is currently being input at the remote computer system.

Embodiments of the host instruction component 140 and instruction providing component 180 of this system provided at a host computer system 110 and one or more instructor computer systems 160 may be part of web conferencing software, as an installable software application, or as a cloud service which maybe the cloud version of the installable software application.

As part of web conferencing software, a captured image and map may be sent from the host computer system to one or more remote computer systems viewing the web conference. The remote computer system may display the captured image on their display component 170 instead of the web conference display. When the display of the web conference at the host computer system 110 changes, a new captured image is sent to the remote computer systems to replace the old one. Along with the new captured image, a new serialized data map is also sent which matches the new image.

Figure 6:
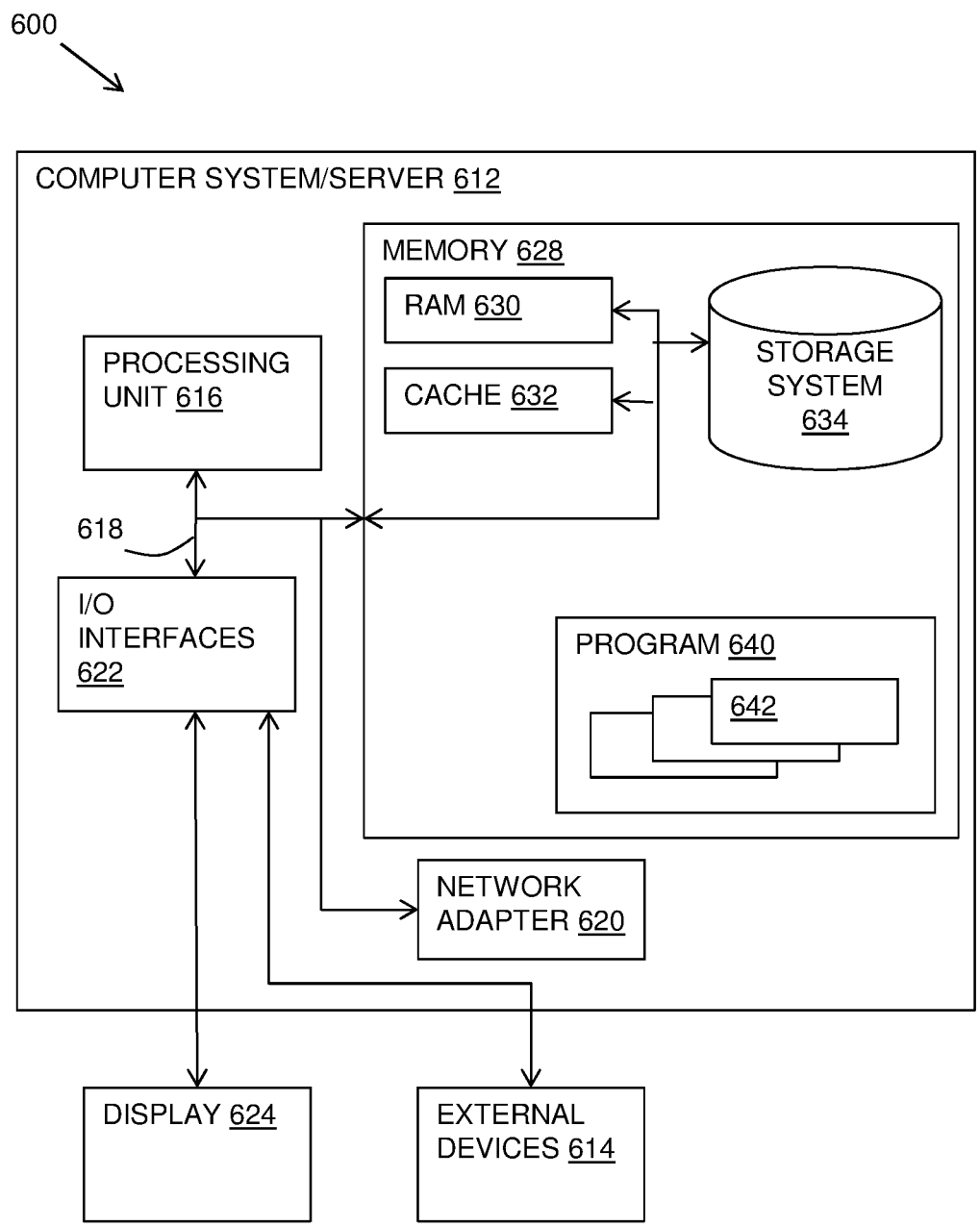
FIG. 6 is a block diagram of an embodiment of a computer system or cloud server in which the present invention may be implemented.

Referring now to FIG. 6, a schematic of an example of a system 600 in the form of a computer system or server is shown.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
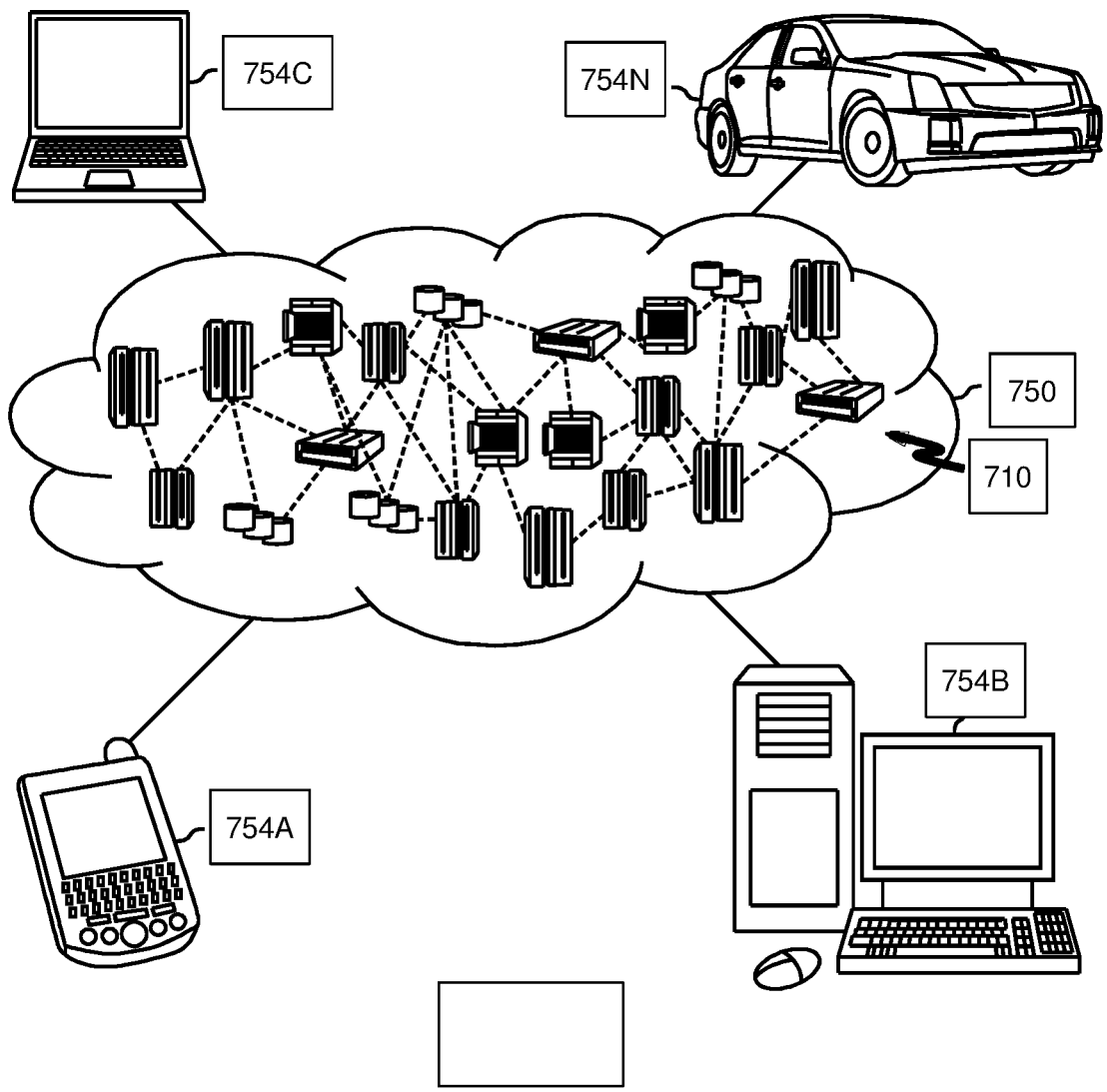
FIG. 7 is a schematic diagram of a cloud computing environment in which the present invention may be implemented.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
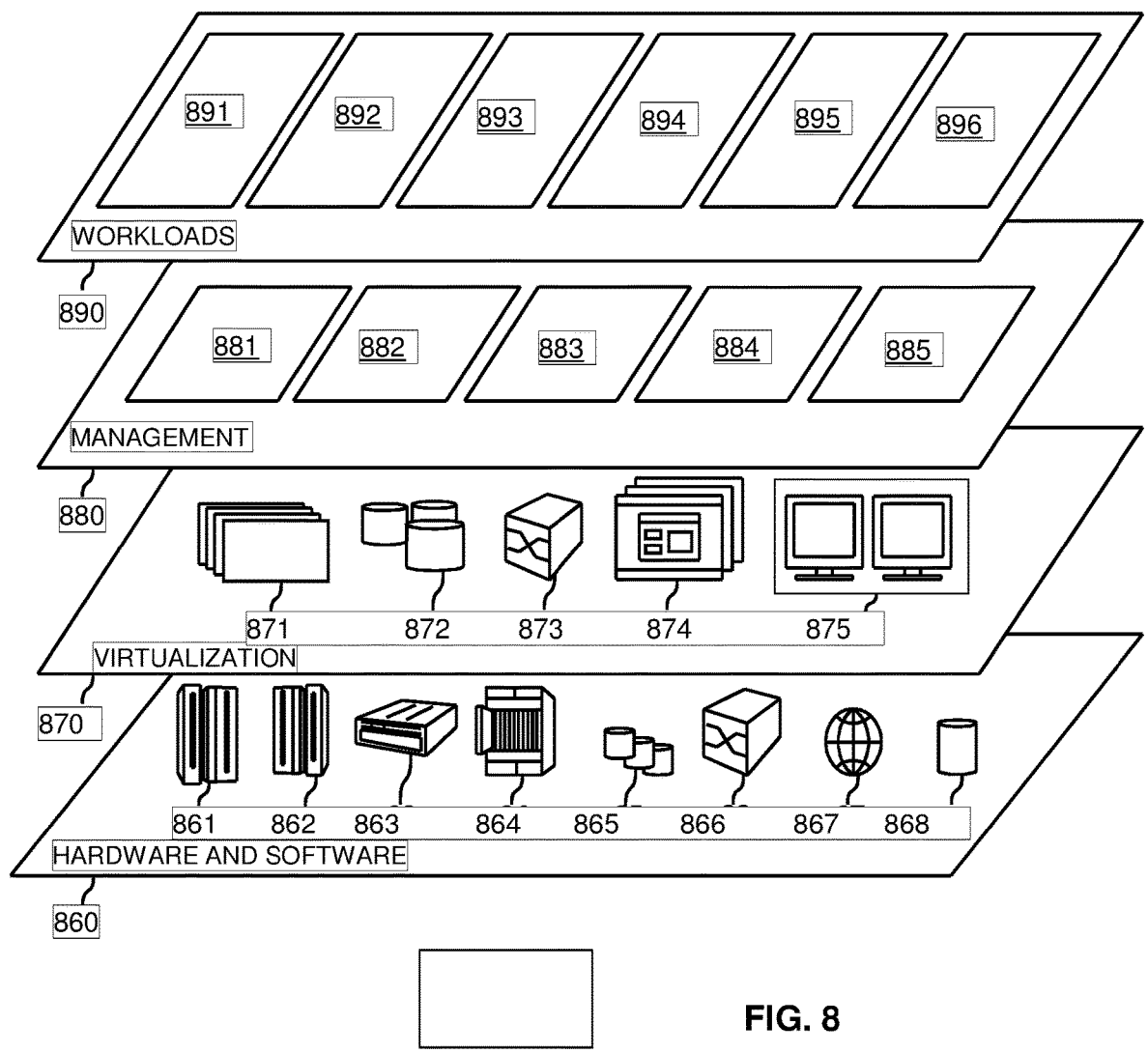
FIG. 8 is a diagram of abstraction model layers of a cloud computing environment in which the present invention may be implemented.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and remote instruction provision 896.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for providing instructions during remote viewing of a user interface, the method carried out at a host computer system and comprising:
  capturing an image of one or more application user interfaces as displayed at the host computer system;
  serializing data of each application user interface to provide a map of each window class and containers and/or control elements of the window class, wherein a container has attributes and child control elements;
  transmitting the captured image and the map to a remote computer system;
  receiving a control element input instruction from the remote computer system for instructing a host user of the host computer system on an interaction with a control element for display in a context of the control element in the one or more application user interfaces of the host computer system, wherein the control element input instruction is based at least in part on an input received from a remote user of the remote computer system; and
  enabling the control element input instruction to be entered into one of the one or more application user interfaces based on a confirmation input from a host user of the host computer system, wherein the confirmation input from the host user of the host computer system is received after the control element input instruction.

2. The method as claimed in claim 1, wherein serializing data of each application user interface includes analyzing each window class in an active application user interface to identify the containers and/or control elements provided by the window class.

3. The method as claimed in claim 1, wherein providing the map includes a type, size and location of each window class and a type, size and location of each container and/or control element within a window class.

4. The method as claimed in claim 1, wherein serializing data of each application user interface analyzes each level of window classes from the top-most level downwards in the display and records the level in the map.

5. The method as claimed in claim 1, wherein receiving the control element input instruction includes one or more of the group of: a control element type, a control element location, a control element identifier, and a remote user identifier.

6. The method as claimed in claim 1, wherein display in a context of the control element in the application user interface includes displaying the control element input instruction adjacent or referencing graphically the control element.

7. The method as claimed in claim 1, wherein receiving the control element input instruction from the remote computer system receives the control element input instruction with a returned original image and/or map to verify that the application user interface is still current and the instruction is applicable to the application user interface.

8. The method as claimed in claim 1, including receiving a holding indication that the control element input instruction from the remote computer system is currently being input at the remote computer system.

9. A computer-implemented method for providing instructions during remote viewing of a user interface, the method carried out at an instructor computer system and comprising:
receiving an image of one or more application user interfaces as displayed at a host computer system and a map serializing the data of each application user interface including each window class and containers and/or control elements of the window class, wherein a container has attributes and child control elements;
identifying a control element in the map by reference to the image;
receiving input of a control element input instruction from a remote user of the instructor computer system, the control element input instruction instructing a host user of the host computer system on an interaction with a control element for display in a context of the control element in the one or more application user interfaces of the host computer system;
transmitting the control element input instruction to the host computer system;
transmitting a holding indication to the host computer system and any other remote computer systems, the holding indication indicating that a control element input instruction is currently being input at a remote computer system; and
enabling the control element input instruction to be entered into one of the one or more application user interfaces based on a confirmation input from the host user of the host computer system, wherein the confirmation input from the host user of the host computer system is received after the control element input instruction.

10. The method as claimed in claim 9, wherein identifying a control element includes:
selecting a point or area as a location in a received image; and
referencing the map to identify the control element at the location.

11. The method as claimed in claim 9, wherein the map includes multiple levels of window classes and identifying the control element in the map by reference to the image includes hit testing each level of window class.

12. The method as claimed in claim 9, wherein receiving the control element input instruction includes:
displaying an instruction template for the type of control element identified;
receiving the input instructing in the instruction template; and
creating the control element input instruction.

13. The method as claimed in claim 9, wherein transmitting the control element input instruction to the host computer system includes transmitting one or more of the group of: a control element type, a control element location, a control element identifier, and a remote user identifier.

14. The method as claimed in claim 9, wherein the control element input instruction is transmitted with a returned original image and/or map to verify that the application user interface at the host computer system is still current.

* * * * *